(12) United States Patent
Peterson (10) Patent No.: US 12,139,858 B2
(45) Date of Patent: Nov. 12, 2024

(54) POWER ACTIVATED STEERING GUIDE

(71) Applicant: Caterpillar Paving Products Inc., Brooklyn Park, MN (US)

(72) Inventor: David N. Peterson, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 770 days.

(21) Appl. No.: 17/101,306

(22) Filed: Nov. 23, 2020

(65) Prior Publication Data
US 2022/0162811 A1    May 26, 2022

(51) Int. Cl.
| | | |
|---|---|---|
| *E01C 19/00* | (2006.01) | |
| *B62D 15/02* | (2006.01) | |
| *E01C 19/22* | (2006.01) | |
| *E01C 19/48* | (2006.01) | |
| *E01C 23/088* | (2006.01) | |
| *E01C 23/16* | (2006.01) | |

(52) U.S. Cl.
CPC .......... *E01C 19/004* (2013.01); *B62D 15/029* (2013.01); *E01C 19/22* (2013.01); *E01C 19/48* (2013.01); *E01C 23/088* (2013.01); *E01C 23/16* (2013.01)

(58) Field of Classification Search
CPC ........ E01C 19/004; E01C 19/22; E01C 19/48; E01C 23/088; E01C 23/16; B62D 15/029
USPC .......................................................... 701/49
See application file for complete search history.

(56) References Cited

U.S. PATENT DOCUMENTS

| | | | |
|---|---|---|---|
| 3,181,441 A | 5/1965 | Flom | |
| 3,334,560 A | 8/1967 | Long et al. | |
| 3,564,986 A | 2/1971 | Burgin | |
| 3,810,313 A * | 5/1974 | Hicks | G01B 5/24 33/193 |
| 3,890,055 A * | 6/1975 | Rochfort | E01C 19/4893 426/643 |
| 4,755,791 A * | 7/1988 | Kuroda | B60R 99/00 362/802 |
| 6,119,397 A * | 9/2000 | Metz | B65G 69/003 404/6 |
| 9,587,937 B2 | 3/2017 | Buschmann et al. | |
| 9,670,629 B2 * | 6/2017 | Buschmann | E01C 19/48 |
| 2006/0220345 A1 * | 10/2006 | Schmidt | B60D 1/36 280/477 |
| 2007/0046070 A1 * | 3/2007 | Hayes | B62D 33/0617 296/190.08 |
| 2010/0150651 A1 * | 6/2010 | Buschmann | E01C 19/48 404/82 |
| 2017/0298578 A1 * | 10/2017 | Mohr | F16M 13/02 |
| 2018/0030672 A1 * | 2/2018 | Marsolek | E01C 19/42 |
| 2018/0327023 A1 * | 11/2018 | Buschmann | E01C 19/22 |
| 2020/0187417 A1 * | 6/2020 | Takaoka | A01D 34/64 |
| 2021/0010210 A1 * | 1/2021 | Ellwein | E01C 19/004 |

(Continued)

*Primary Examiner* — Krishnan Ramesh (57) ABSTRACT

A work machine may include a frame supported by a traction device and a power activated steering guide secured to the frame. The power activated steering guide may include a trunk portion arranged and configured to articulate laterally relative to a travel direction of the work machine. The trunk portion may include an actuation mechanism configured to perform articulation and a controller configured for controlling the actuation mechanism to articular the trunk portion to an offset dimension.

18 Claims, 5 Drawing Sheets

(56) References Cited

U.S. PATENT DOCUMENTS

2021/0247514 A1* 8/2021 Horn .................. G01S 17/88
2022/0389665 A1* 12/2022 Pinson ................ E01C 19/48

* cited by examiner

POWER ACTIVATED STEERING GUIDE

TECHNICAL FIELD

The present disclosure relates generally to work machines, More particularly, the present disclosure relates to guides for work machines that perform operations having an alignment component. Still more particularly, the present disclosure relates to automatic guides for roadwork machines.

BACKGROUND

Roadways are built to facilitate vehicular travel and, as such, are designed to be generally straight and/or have smooth curves. Roadwork machines that perform pavement removal, rotary mixing, and installation operations, thus, may be designed to follow relatively straight lines or smooth curves. Still other roadwork machines such as striping equipment or other roadwork machines may also be designed to follow relatively straight lines or smooth curves. For this purpose, roadwork machines often include a guide that provides the operator with a visual indicator of whether the machine is tracking the appropriate path. Current guides are cumbersome at best. The machine must be stopped and the operator or other personnel mush manually adjust the guide before returning the machine to operation.

U.S. Pat. No. 9,587,937 relates to a construction machine with a setup assistance system for a sensor unit. The construction machine has a sensor unit with a measurement range and the sensor unit is variable in its orientation relative to the construction machine.

SUMMARY

In one or more embodiments, a work machine may include a frame supported by a traction device and a power activated steering guide secured to the frame. The power activated steering guide may include a trunk portion arranged and configured to articulate laterally relative to a travel direction of the work machine. The trunk portion may include an actuation mechanism configured to perform articulation and a controller configured for controlling the actuation mechanism to articular the trunk portion to an offset dimension.

In one or more embodiments, a method of adjusting a steering guide on a work machine may include receiving, at a controller, a command to adjust the steering guide to an offset dimension. The method may also include controlling, with the controller, an actuation mechanism on the steering guide to articulate a trunk of the steering guide laterally relative to a travel direction of the work machine until an external end thereof reaches the offset dimension.

DETAILED DESCRIPTION

Figure 1:
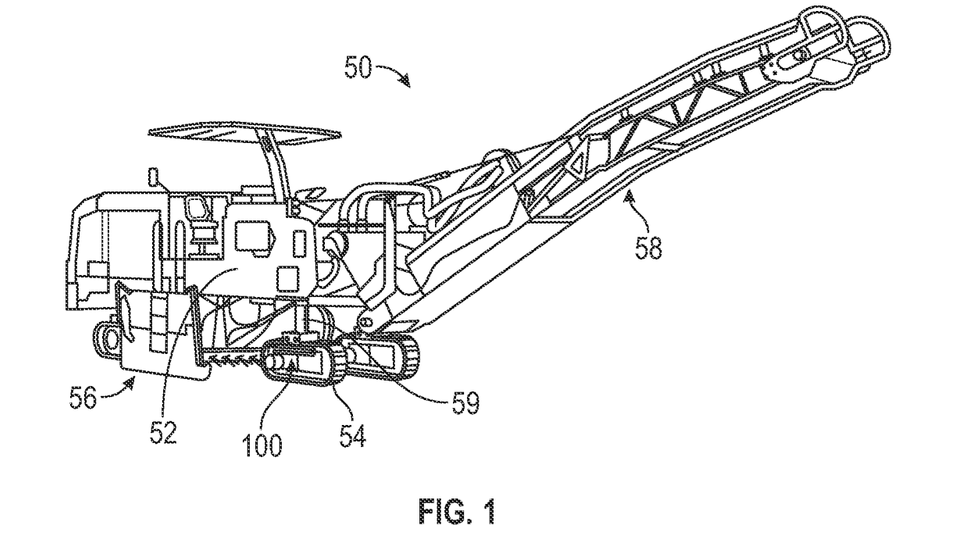
FIG. 1 is a front and side perspective view of a cold planar having a power activated steering guide, according to one or more embodiments.

FIG. 1 is a perspective view of a roadwork machine in the form of a cold planar 50 having a power activated steering guide 100 according to one or more embodiments. A cold planar 50 may be adapted to remove a pavement surface from a roadway, parking lot, or other paved area. The cold planar 50 may often be used to remove pavement along a relative straight path or smooth curve such as those found on roadways. The power activated steering guide 100, discussed in more detail below may be used as a visual indicator to an operator that the roadwork machine is following a suitable path. As shown, the cold planar 50 may include a frame 52 supported by a traction device 54 or system. The cold planar 50 may include a milling drum 56 supported by the frame 52 and a conveyor 58 for conveying milled material away from the milling drum 56 and into a truck, for example. The depth of the milling drum into the roadway surface may be controlled by one or more actuation devices 59 arranged between the traction device 54 and the frame 52, That is, the milling drum 56 may be supported by the frame 52 and adjustment of the frame 52 upward or downward may, in turn, cause the milling drum to move upward and downward. The milling drum may extend across the frame and may have a protective housing or shroud surrounding it. The power activated steering guide 100 may extend out the side of the cold planar and forward from the cold planar to provide a direct sightline from the operator to the guide. The guide may be aligned with a side of a roadway or other alignment guide such that the operator may maintain alignment of the roadwork machine as it travels along a milling path.

Figure 2:
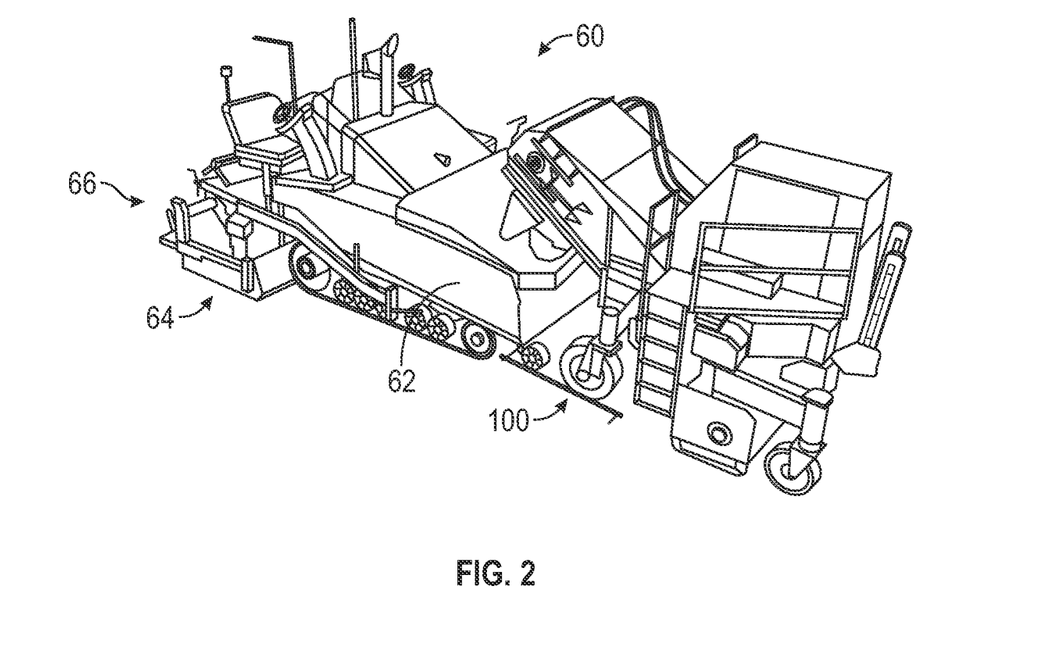
FIG. 2 is a front and side perspective view of an asphalt paving machine having a power activated steering guide according to one or more embodiments.

FIG. 2 is a perspective view of a roadwork machine in the form of an asphalt paving machine 60. The asphalt paving machine 60 may be configured to receive asphalt mix into a hopper 62, convey the asphalt mix to a screed 64 with an auger (internal), and place the asphalt mix on a roadway surface in a controlled manner with the screed 64. The asphalt paving machine 60 may control the width of the pavement, the thickness, and the density of the pavement being placed. In one or more embodiments, the screed may include screed extensions 66 allowing the width of the pavement being placed to be adjusted. Moreover, the screed 64 may be adjusted upward and downward to control the thickness of the pavement being placed. The power activated steering guide 100 may extend out the side of the asphalt paving machine and forward from the machine to provide a direct sightline from the operator to the guide. The guide 100 may be aligned with a side of the intended roadway, an edge of previously laid asphalt, or other alignment guide such that the operator may maintain alignment of the roadwork machine as it travels along a pavement path. It is to be appreciated that while a cold planer and a paving machine have been shown as examples of a roadwork machine, still other machines may constitute roadwork machines. For example, road reclaimers, rotary mixers, and still other machines may constitute roadwork machines. Moreover, most any work machine having a need for aligned motion may use the power activated steering guide disclosed herein and nothing should limit the use of the guide to a roadwork machine. For example, other work machines that may rely on aligned motion may include trenchers, loaders, skid steers, or still other work machines.

Figure 3:
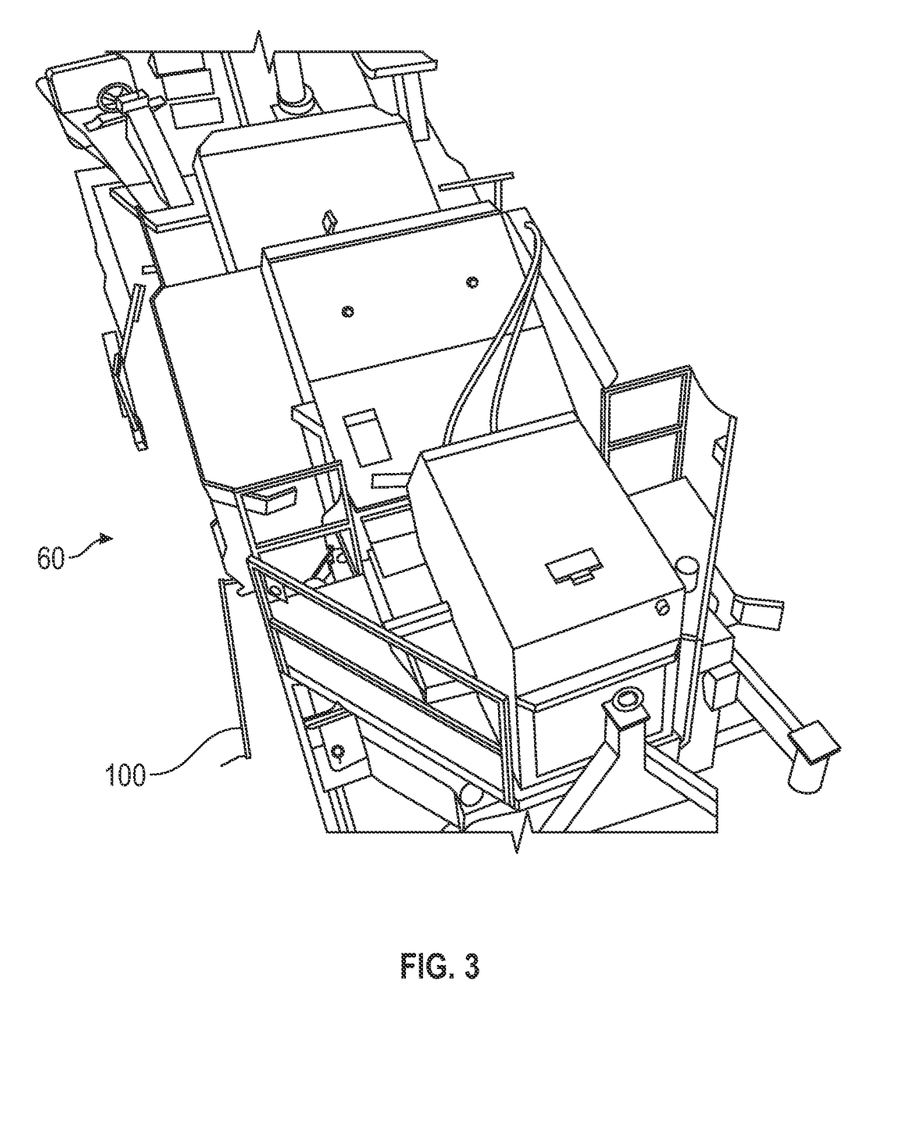
FIG. 3 is a top and side perspective view side view of an asphalt paving machine having a power activated steering guide, according to one or more embodiments.

FIG. 3 shows a top perspective view of the asphalt paving machine 60 of FIG. 3. As shown, the power activated steering guide 100 may extend laterally from the machine and forward so as to provide the operator with direct sightlines to the guide. As shown, the guide 100 is in alignment with an edge of previously laid pavement. As the operator steers the machine, the operator may maintain the steering guide 100 in alignment with the edge of the previously laid pavement such that edge of the screed of the asphalt paving machine follows the edge as well.

Figure 4:
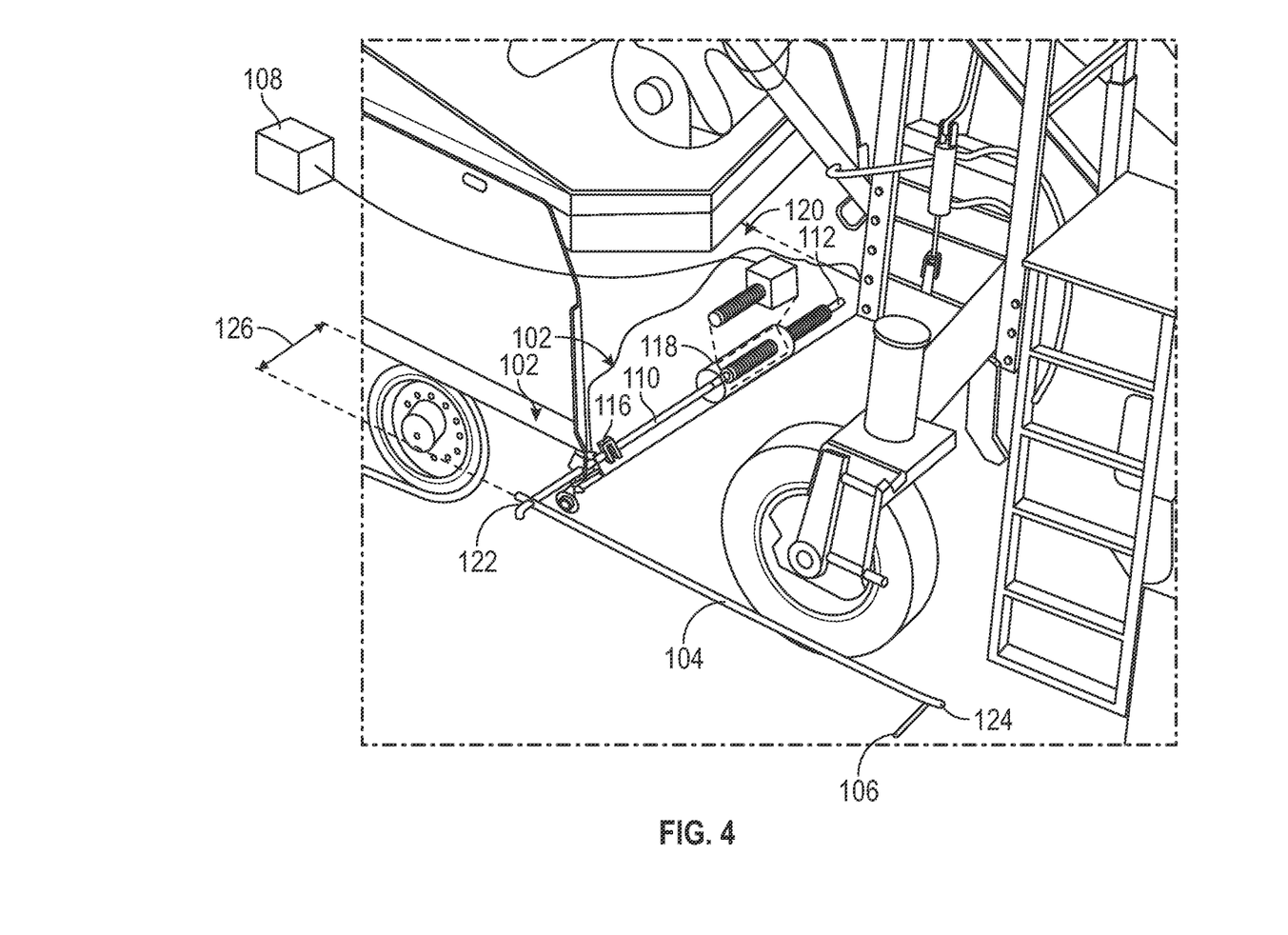
FIG. 4 is break away view of an actuation mechanism of the power activated steering guide, according to one or more embodiments.

Turning now to FIG. 4, a more detailed discussion of the power activated steering guide 100 may be provided. FIG. 4 is a close up partial break away view of the power activated steering guide 100. As suggested above the power activated steering guide 100 may be configured to adjustably extend laterally from a work machine 50/60 and forward from the machine to provide direct sightlines to the guide by the operator. The adjustment of the power activated steering guide 100 may allow for changes to the operation of the machine. For example, in the case of an asphalt paving machine, the screed size may be adjusted to place different selected widths of pavement. The steering guide 100 may be adjusted in these instances to account for the selected width of pavement and to allow for alignment of the steering guide with the edge of the screed. As shown, the power activated steering guide 100 may include a trunk portion 102, a branch portion 104, a drag component 106, and a controller 108. Each of these components may be discussed in turn.

The trunk portion 102 may be configured for supporting the guide 100 and for adjusting the guide laterally relative to the machine 50/60. In one or more embodiments, as shown in FIG. 4, the trunk portion 102 may include a shaft, rod, tube, or other elongate element 110 defining a longitudinal axis. The elongate element 110 may be arranged generally transverse to the travel direction of the machine such that the elongate element 110 may extend generally out the side of the work machine. The elongate element 110 may be configured to be adjustable along the longitudinal axis allowing the extent to which the elongate element 110 extends out the side of the machine to be adjusted and, as such, allowing the steering guide position to be adjusted based on varying work situations. The elongate element 110 may have a first or internal end 112 and a second or external end 114. In one or more embodiments, the elongate element may be supported at or near the outside edge of the work machine by a sleeve, lug, nut, bushing, seal, bearing, or other external supporting element 116. The second or external end of the elongate element may pass through the external supporting element. The first or internal end may be secured to or engaged with a sleeve, lug, nut, bushing, seal, bearing, or other internal supporting element 118. As such, the elongate element 110 may extend laterally out the side of the work machine in cantilevered and adjustable fashion where the internal and external supporting elements 116/118 support the elongate element 110 in spaced apart fashion to maintain the elongate element 110 in a generally horizontal orientation. The internal and external supporting elements may include smooth sleeves or internal threading for engaging with external threading on the elongate element as explained in more detail below.

The lateral position of the elongate element 110 may be controlled by an actuation mechanism 120. In the embodiment shown in FIG. 4, the actuation mechanism 120 may include a screw drive, for example. As shown, an electrically driven screw drive 120 may be positioned adjacent and generally parallel to the elongate element 110, The elongate element 110 may include threads on an outer surface thereof that are adapted for engagement by the screw drive. The internal supporting sleeve 118 may include an access window extending longitudinally along the sleeve and allowing a threaded screw or other gear mechanism of the screw drive to engage the threads on the elongate element 110. In other embodiments, the screw drive may be placed adjacent to the internal supporting element along the length of the elongate element. The screw drive may be secured to the work machine in a substantially stationary position. As such, when the screw drive is actuated, the elongate element 110 may be forced outward or inward, depending on the direction of actuation of the screw drive and due to the engagement of the threads on the elongate element with the gear of the screw drive. The screw drive may be reversible to extend or retract the elongate element and, as such, adjust the steering guide further out the side of the machine or closer in. The screw drive may prevent unintended adjustment of the steering guide by preventing extension or retraction unless actuated.

As mentioned, the external and internal support mechanisms 116/118 may include internal threading to receive and engage with the threads on the outside of the elongate element. In some embodiments, for example, the elongate element may extend up to five feet out the side of the machine and the overall length of the elongate element may be approximately ten feet. When the elongate element is fully retracted, the second or external end may be supported by the external supporting element and the elongate element may extend generally fully across the width of the machine such that the first or internal end is positioned on an opposite side of the machine. In view of the relatively large extension as a percentage of the overall length of the elongate element, a relatively large length of the elongate element may be threaded. As such, the threaded portion of the elongate element may engage both the internal and external supporting elements 116/118 at some point throughout its stroke. In one or more embodiments, substantially the full length of elongate element may be threaded.

The branch portion 104 may extend from the second or external end 114 of the trunk portion 102 and may be adapted to reach forward along the machine to a point allowing for direct sight lines by the operator. In one or more embodiments, the branch portion may include an elongate shaft, rod, pipe, conduit, or tube having a connected end 122 and a free end 124. The branch portion may be pinned at its connected end to the trunk portion 102 with a vertically arranged pin such that the branch portion 104 may be pivoted between a storage position (extending rearward from the trunk portion) and a deployed position (extending forward from the trunk portion). In one or more embodiments, the branch portion 104 may be a telescoping branch having a sleeve portion and a rod portion and include a set screw or other locking mechanism for securing the rod portion in an extended position. In one or more embodiments, this extension may include an actuator that is the same or similar to the trunk portion. In still further embodiments, the branch portion 104 may have a hinge or hinges rather than a telescoping component such that the branch portion may be folded about one or more vertically extending axes to collapse the branch portion.

It is to be appreciated that the branch portion 104 may be helpful to assist in reaching to a point more readily visible by the operator. However, in one or more embodiments, the branch portion may be omitted and the operator may rely on the external end of the trunk portion for alignment guidance.

The drag component 106 may extend from the free end 124 of the branch portion 104, The drag component 106 may be adapted to drag on the road surface or hang from the free end 124 of the branch portion so as to provide perspective to the operator as to the position on the roadway surface that the free end 124 is hovering above. In one or more embodiments, the drag portion 106 may include a chain or other relatively flexible element that is also relatively heavy to avoid being affected by winds or breezes, for example. In one or more other embodiments, the drag element may include a plastic or other flexible element adapted to flexibly engage and drag on the ground surface thereby providing a slight amount of support to the free end of the branch portion without affecting its lateral position. Like the branch portion, the drag component may be omitted where the operator does not need or does not desire a feature that contacts or approaches the ground.

The controller 108 may be a part of the control console of the work machine. That is, the machine may include a computing device having a computer readable storage medium and instructions stored thereon for deploying and manipulating various component of the work machine such as the screed and the heating elements in the case of an asphalt paving machine or the milling drum and the conveyor in the case of a cold planer. The computing device may also include a processor for executing the instructions in response to operator control inputs and other inputs and directions. In the present embodiment, the instructions stored on the computer readable storage medium may include instructions for adjusting the power activated steering guide and, as such, the computing device may function as the controller for the steering guide. In other embodiments, a dedicated controller may be provided. The controller 108 may be in wired or wireless signal communication with the actuation mechanism 120 on the power activated steering guide 100 and may be adapted to control the trunk portion and/or the branch portion of the steering guide based on operator instructions.

In one or more embodiments, the instructions on the computer readable storage medium may be adapted for selected adjustment by the operator. That is, for example, the offset distance 126 (i.e., the distance lateral of the work machine) of the steering guide may be selected and input. For example, if a 10 foot wide machine is being used and the desired pavement width is 12 feet, a 1 foot offset distance may be selected by the operator and input into the machine such that the steering guide aligns with the pavement screed. That is, the pavement screed may be 12 foot wide for a 12 foot wide pavement and, as such, may extend 1 foot laterally beyond each side of the work machine. In an English Unit system, increments of a foot, an inch, or fractions of an inch such as eights, or sixteenths may be available on the selector. The controller 108 may provide a signal to the actuation mechanism 120 of the trunk portion 102 of the power activated steering guide 100 and may operate the actuation mechanism 120 until the trunk is properly adjusted. In one or more embodiments, the controller 108 may be calibrated by returning the trunk to a fully retracted state (i.e., zero offset) and then the controller may rely on the operational speed and known travel of the actuation mechanism to determine how long to run the actuation mechanism. In other embodiments, one or more electronic sensors may be positioned along the trunk to determine when to stop the actuation mechanism. In still further embodiment, the computer implemented instructions may allow the operator to operate the actuation mechanism and rely on visual inspection (either via cameras or direct lines of sight or other personnel) to determine a suitable extension of the trunk.

In one or more other embodiments, the system may include algorithms for determining the pavement width and adjusting the power activated steering guide accordingly. In one or more embodiments, for example, an operator may input a pavement width rather than an offset. The controller 108 may receive the pavement width, retrieve a machine width from the computer readable storage medium, subtract the machine width, and divide the result by two to arrive at an offset position 126. Given the calculated offset position, the controller may control the position of the trunk to place the external end of the trunk at the offset 126. Still other approaches to arriving at a power activated steering guide position based on a pavement width may be used. In one or more embodiments, a full roadway width may be entered into the controller. For example, the operator may input a 24 foot width for a roadway. Given the limits on the screed extensions, the need for a crown in most roadway surfaces and other factors, the computing device may calculate the pavement width to be applied and adjust the power activated steering guide accordingly. For example, where a 10 foot wide machine with five foot extendable screeds is used, the maximum pavement section width may be approximately 20 feet. However, given the crown in the road, two 12 foot wide pavement sections may be placed. In view of the 12 foot wide pavement sections, the computing device may subtract the machine width and divide by two to arrive at a 1 foot offset dimension 126 for the power activated steering guide. Based on the calculated offset, the controller may adjust the steering guide via the actuation mechanism to a 1 foot offset. Still other approaches to calculating an offset based on a full roadway width may be provided.

In one or more embodiments, the actuation of the steering guide may be tied to the extension or retraction of screed extensions. For example, an operator may adjust the width of the screed on an asphalt paving machine to create a pavement width that is desired. Like the power activated steering guide, the screed extensions may extend laterally away from each side of the machine and the edge of the screed extension may define the desired edge of the pavement. In one or more embodiments, an operator may adjust the screed extensions and the computing device may determine the offset of the power activated steering guide based on the adjusted position of the screed extensions. For example, if an operator adjusts the screed extensions for a 14 foot wide pavement section, the computing system may recognize that the screed extensions are extending 2 feet out of each side of a 10 foot machine and as such, may establish a 2 foot offset. Based on the established 2 foot offset, the controller may adjust the power activated steering guide to a 2 foot offset as well. Still other approaches to establishing an offset based on the position of screed extensions may be provided.

Figure 5:
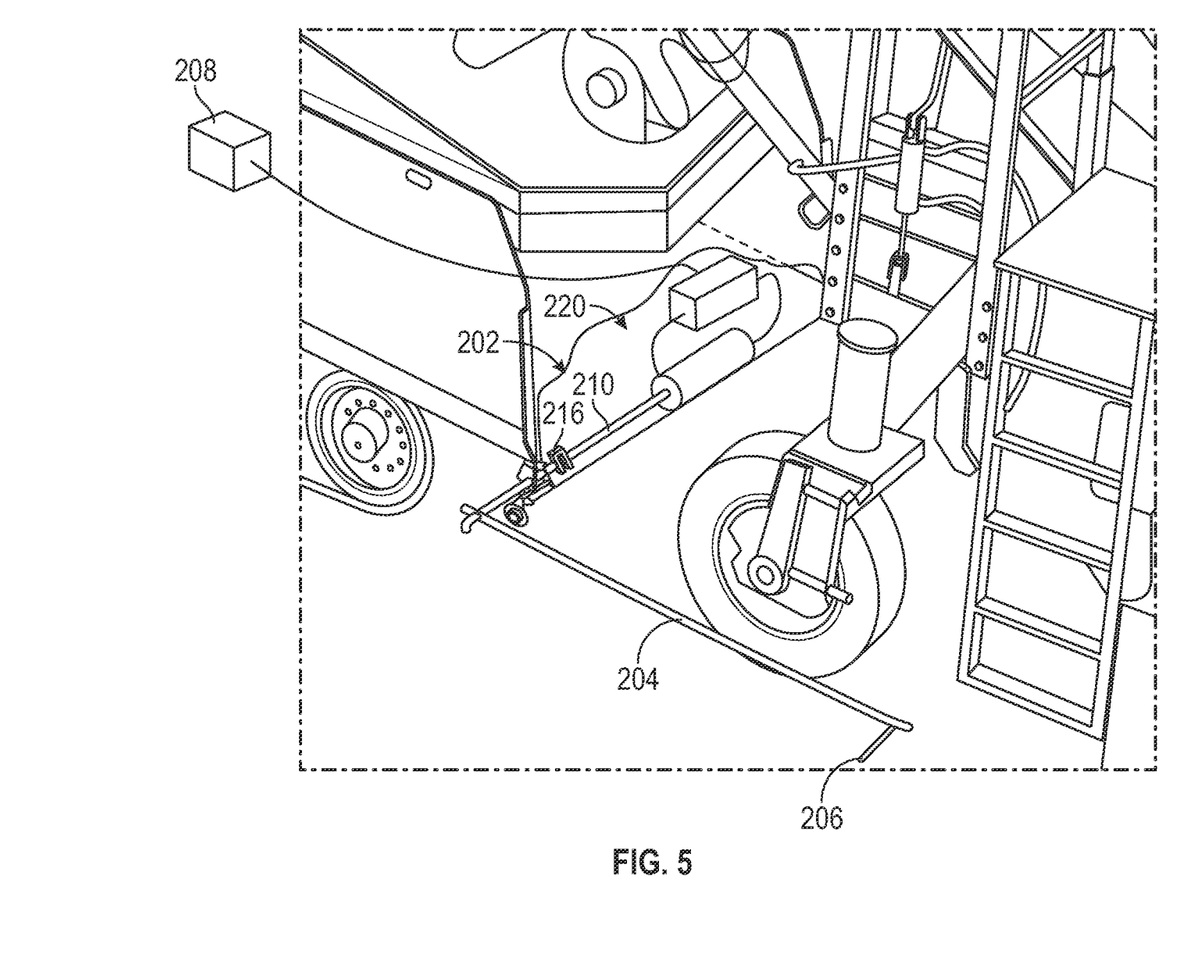
FIG. 5 is break away view of an actuation mechanism of the power activated steering guide, according to one or more embodiments.

Turning now to FIG. 5, another embodiment of a power activated steering guide 200 is shown. In this embodiment, a hydraulic actuator 220 may be provided. That is the elongate element 210 of the trunk portion 202 described with respect to FIG. 4 may be a rod of a hydraulic cylinder in the present embodiment. As shown, a hydraulic cylinder may be arranged within the body of the work machine and actuation of the hydraulic cylinder may cause the rod to extend from the cylinder and out the side of the road work machine. The branch 204, drag 206, and controller 208 portions of the present embodiment may be the same or similar to those described above.

INDUSTRIAL APPLICABILITY

Figure 6:
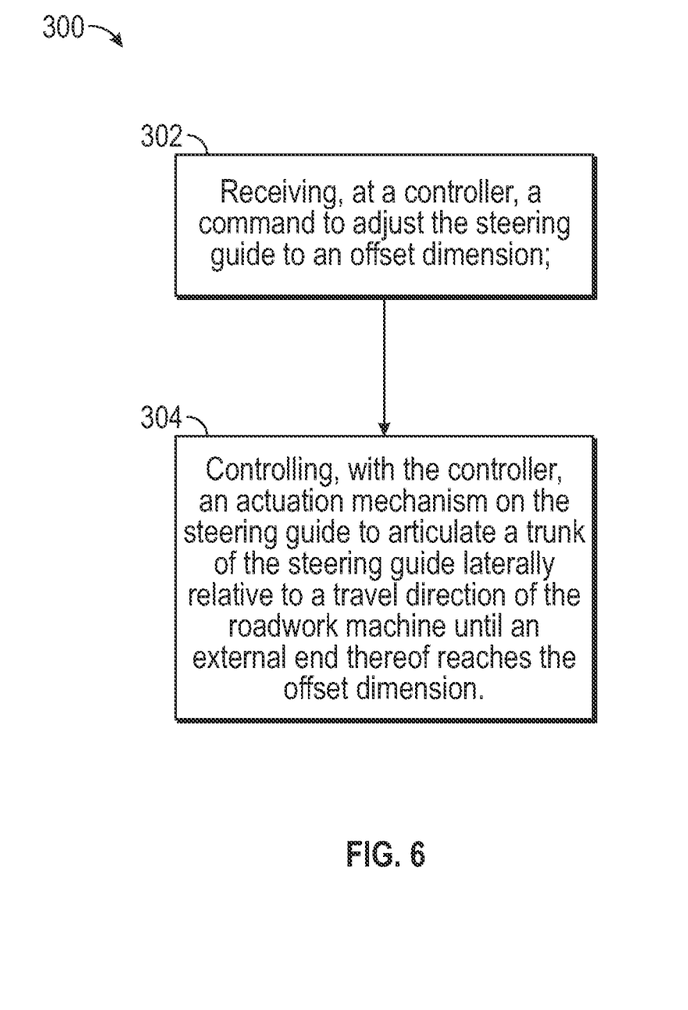
FIG. 6 is a method of diagram of a method of deploying a steering guide, according to one or more embodiments.

In operation and use, a method of automatically adjusting a power activated steering guide may be provided. (300) For example, an operator may, at a machine console, enter an actuation command. In one or more embodiments, the operator may enter a command to adjust the power activated steering guide and the operator may continue entering the command while the steering guide moves into position. The operator may cease entering the command when the operator believes the steering guide to be properly adjusted. In one or more other embodiments, the operator may enter a command by entering an offset distance. In still other embodiments, the operator may enter a command by entering a pavement width. In still other embodiments, the operator may enter a command by entering a roadway width and/or other parameters associated with the project such as a roadway crown, a centerline position or a crown position, a number of lanes, and the like.

In the above cases, the controller may receive the actuation command as an input from the operator console. (302) Where the input received provides active instructions to adjust the power activated steering guide, the controller may transmit a signal to the actuation device to control the actuation device to arrive at the offset dimension. (304) In this instance, the controller may control the actuation device and may continue to do so unless/until the active instructions stop (i.e., when the operator ceases entering the command). The signal to the actuation device may be a forward or reverse signal based on the operator input and may power the actuation device to extend or retract the trunk portion of the steering guide.

Where the input received provides an offset distance, the controller may transmit a signal to the actuation device and may continue to do so unless/until the trunk portion of the steering guide reaches the input offset distance. The controller may rely on the known position of the trunk portion and the speed of travel of the trunk portion to identify when the steering guide reaches the input offset. In one or more other embodiments, the controller may receive input from a sensor or sensors that monitor the position of the trunk portion and may stop actuation based on sensor readings that indicate the selected offset has been established.

Where the input received comprises a pavement width, the controller may perform a series of calculations to establish an offset dimension. For example, in one or more embodiments, the controller may access a stored work machine width, subtract the machine width from the pavement width, and divide the result by two to establish an offset dimension. With the offset dimension established, the controller may adjust the position of the steering guide in a manner the same or similar to the steps used Where the operator inputs the offset dimension directly.

Where the input received comprises a roadway width, the controller may perform a series of calculations to establish an offset dimension. For example, in one or more embodiments, the controller may rely on the full roadway width that was entered in addition to a stored maximum screed width. The controller may also access information about a crown or crown position. Based on this information, the controller may calculate one or more pavement widths to be used to pave the roadway. In one example, the full roadway width may be 30 feet and be made up of two 12 foot lanes and two 3 foot shoulders. The fully extended screed width of the machine may be, for example 20 feet based on a 10 foot wide machine and 5 foot screed extensions out each side of the machine. As such, a minimum of two pavement passes may be used to pave the full 30 foot width. Moreover, since there are two lanes and a crown in the road, the controller may establish that two passes of 15 foot pavement may be provided. Given the 15 pavement width, the controller may subtract the 10 foot machine width and divide the result of 5 by two, to establish an offset of 2 foot 6 inches. Given the offset of 2 foot 6 inches, the controller may adjust the automatic steering guide to an offset distance of 2 foot 6 inches using the approach described where the operator directly inputs the offset distance.

In still other embodiments, the operator may not enter a command and, instead, the offset distance of the steering guide may be adapted to follow the screed extensions. For example, a screed may be adjusted to provide a selected roadway width. Based on the adjusted screed dimension, the controller may establish an offset dimension as being the same or similar as the dimension each screed is extended. Upon establishing the offset dimension, the controller may adjust the power activated steering guide to an offset distance equal to the screed extension using the approach described above where the operator directly inputs the offset distance.

With the power activated steering guide adjusted, the operator may pave the roadway using the steering guide to maintain the alignment of the roadway machine with an established guide such as a stake line, a painted line, a pavement edge, or the like, That is, the operator may steer the machine in a manner that maintains the free end of the branch portion of the steering guide above the guide.

The above detailed description is intended to be illustrative, and not restrictive. The scope of the disclosure should, therefore, be determined with references to the appended claims, along with the full scope of equivalents to which such claims are entitled.

What is claimed is:

1. A work machine, comprising:
 a frame supported by a traction device; and
 a power activated steering guide secured to the frame and extending forward from the work machine and laterally to provide a forward-looking operator with direct sight-lines to the guide, the guide comprising:
  a trunk portion comprising an elongate element defining a longitudinal axis and being arranged such that the longitudinal axis extends laterally and transverse to a travel direction of the work machine, the elongate element being configured to articulate along the longitudinal axis and the trunk portion having an actuation mechanism configured to articulate the elongate element;
  a branch portion coupled at a first end to an external end segment of the trunk portion and extending therefrom to a second end, the branch portion configured to separately articulate between:
   a stored position; and
   a deployed position, wherein the second end is extended outwards from the stored position in the travel direction of the work machine; and
  a controller configured for controlling the actuation mechanism to articulate the elongate element to an offset dimension.

2. The work machine of claim 1, wherein the actuation mechanism is a screw drive.

3. The work machine of claim 1, wherein the actuation mechanism is a hydraulic cylinder.

4. The work machine of claim 1, wherein the controller is configured to receive a continuous command and control the actuation mechanism until the command ceases.

5. The work machine of claim 1, wherein the controller is configured to receive the offset dimension and control the actuation mechanism to articulate the trunk until an external end thereof reaches the offset dimension.

6. The work machine of claim 1, wherein the controller is configured to receive a pavement width, establish the offset dimension based on the pavement width, and control the actuation mechanism to articulate the trunk until an external end thereof reaches the offset dimension.

7. The work machine of claim 1, wherein the controller is configured to receive a roadway width, establish the offset dimension based on the roadway width, and control the actuation mechanism to articulate the trunk until an external end thereof reaches the offset dimension.

8. The work machine of claim 1, wherein the controller is configured to receive a screed extension dimension, establish the offset dimension based on the roadway width, and control the actuation mechanism to articulate the trunk until an external end thereof reaches the offset dimension.

9. The work machine of claim 1, wherein the work machine comprises a paving machine.

10. The work machine of claim 1, wherein the work machine comprises a cold planer.

11. The work machine of claim 1, wherein the work machine comprises road striping equipment.

12. A method of adjusting a steering guide on a work machine, the steering guide having a trunk portion and a branch portion and extending forward from the work machine and laterally to provide a forward-looking operator with direct sightlines to the guide, the method comprising:

receiving, at a controller, a command to adjust the steering guide to an offset dimension;

controlling, with the controller, an actuation mechanism on the steering guide to move the steering guide from a stored position to a deployed position by:
articulating an elongate element of the trunk portion of the steering guide laterally and transverse to a travel direction of the work machine, along a longitudinal axis of the elongate element, and until an external end thereof reaches the offset dimension; and
articulating an elongate element of the branch portion of the steering guide such that the branch portion extends outwards from the trunk portion in a travel direction of the work machine.

13. The method of claim 12, wherein receiving a command comprises continually receiving a command and controlling the actuation mechanism comprises continually controlling the actuation mechanism until the command ceases.

14. The method of claim 12, wherein receiving a command comprises receiving the offset dimension.

15. The method of claim 12, wherein receiving a command comprises receiving a pavement width, the method further comprising establishing, with the controller, the offset dimension based on the pavement width.

16. The method of claim 12, wherein receiving a command comprises receiving a roadway width, the method further comprising establishing, with the controller, the offset dimension based on the roadway width.

17. The method of claim 12, wherein receiving a command comprises receiving a screed extension dimension, the method further comprising establishing, with the controller, an offset dimension based on the screed extension dimension.

18. The method of claim 12, wherein the work machine is a paving machine and the method further comprises operating the paving machine to pave a roadway surface using the steering guide.

* * * * *